US011000012B2

(12) United States Patent
Nolan

(10) Patent No.: US 11,000,012 B2
(45) Date of Patent: May 11, 2021

(54) COLLAPSIBLE SCENT TRAINING WHEEL

(71) Applicant: Patrick L. Nolan, Smithsburg, MD (US)

(72) Inventor: Patrick L. Nolan, Smithsburg, MD (US)

( * ) Notice: Subject to any disclaimer, the term of this patent is extended or adjusted under 35 U.S.C. 154(b) by 176 days.

(21) Appl. No.: 16/170,455

(22) Filed: Oct. 25, 2018

(65) Prior Publication Data

US 2020/0128791 A1   Apr. 30, 2020

(51) Int. Cl.
*A01K 15/02* (2006.01)
*F16M 11/38* (2006.01)
*F16M 11/08* (2006.01)

(52) U.S. Cl.
CPC ............. *A01K 15/02* (2013.01); *F16M 11/08* (2013.01); *F16M 11/38* (2013.01); *F16M 2200/066* (2013.01)

(58) Field of Classification Search
CPC ...... A01K 15/027; A01K 15/02; F16M 11/08; F16M 11/242
USPC .......................................................... 119/701
See application file for complete search history.

(56) References Cited

U.S. PATENT DOCUMENTS

| | | | |
|---|---|---|---|
| 3,424,132 A | 1/1969 | Fischer et al. | |
| 3,773,018 A | 11/1973 | Profughi | |
| 3,981,274 A | 9/1976 | Curtis | |
| 5,829,461 A * | 11/1998 | Ramsey | B08B 9/0433 134/167 R |
| 6,213,056 B1 | 4/2001 | Bergmann et al. | |
| 7,156,054 B1 * | 1/2007 | York | A01K 15/027 119/701 |
| 7,198,008 B2 | 4/2007 | Poyner | |
| 8,297,228 B2 * | 10/2012 | Phelps | A01K 5/0107 119/60 |
| 8,322,598 B1 * | 12/2012 | Farentinos | A47G 29/1216 232/39 |
| 8,505,867 B2 * | 8/2013 | Conrad | H01Q 1/12 248/431 |
| 9,545,081 B2 | 1/2017 | Nolan | |
| 10,159,221 B1 * | 12/2018 | Estes | A01K 29/005 |
| 2006/0174843 A1 | 8/2006 | Poyner | |
| 2007/0108355 A1 * | 5/2007 | Li | F16M 11/24 248/280.11 |

(Continued)

*Primary Examiner* — Magdalena Topolski
*Assistant Examiner* — Kevin M Dennis
(74) *Attorney, Agent, or Firm* — Edell, Shapiro & Finnan, LLC

(57) ABSTRACT

A collapsible scent training wheel for training animals to detect and respond to target scent material. The training wheel includes a support base configured to be positioned on a support surface and a rotatable carousel including a top plate and a plurality of support arms extending radially outward from the top plate. Each support arm has a first end rotatably connected to the top plate and a second end configured to be coupled to a scent receptacle. The training wheel also includes a hub assembly detachably mechanically coupling the rotatable carousel to the support base, wherein the hub assembly is configured to permit the carousel to rotate relative to the base. The connection between the first ends of each support arm and the top plate permits each of the support arms to rotate relative to the top plate between an open position and a collapsed storage position.

20 Claims, 12 Drawing Sheets

(56) References Cited

U.S. PATENT DOCUMENTS

| | | | |
|---|---|---|---|
| 2008/0042020 A1* | 2/2008 | Laitila | F16M 11/041 |
| | | | 248/131 |
| 2010/0314513 A1* | 12/2010 | Evans | F16M 11/28 |
| | | | 248/217.4 |
| 2012/0217356 A1* | 8/2012 | Park | H04N 7/181 |
| | | | 248/122.1 |
| 2015/0264892 A1 | 9/2015 | Nir et al. | |
| 2016/0081302 A1 | 3/2016 | Hare et al. | |

* cited by examiner

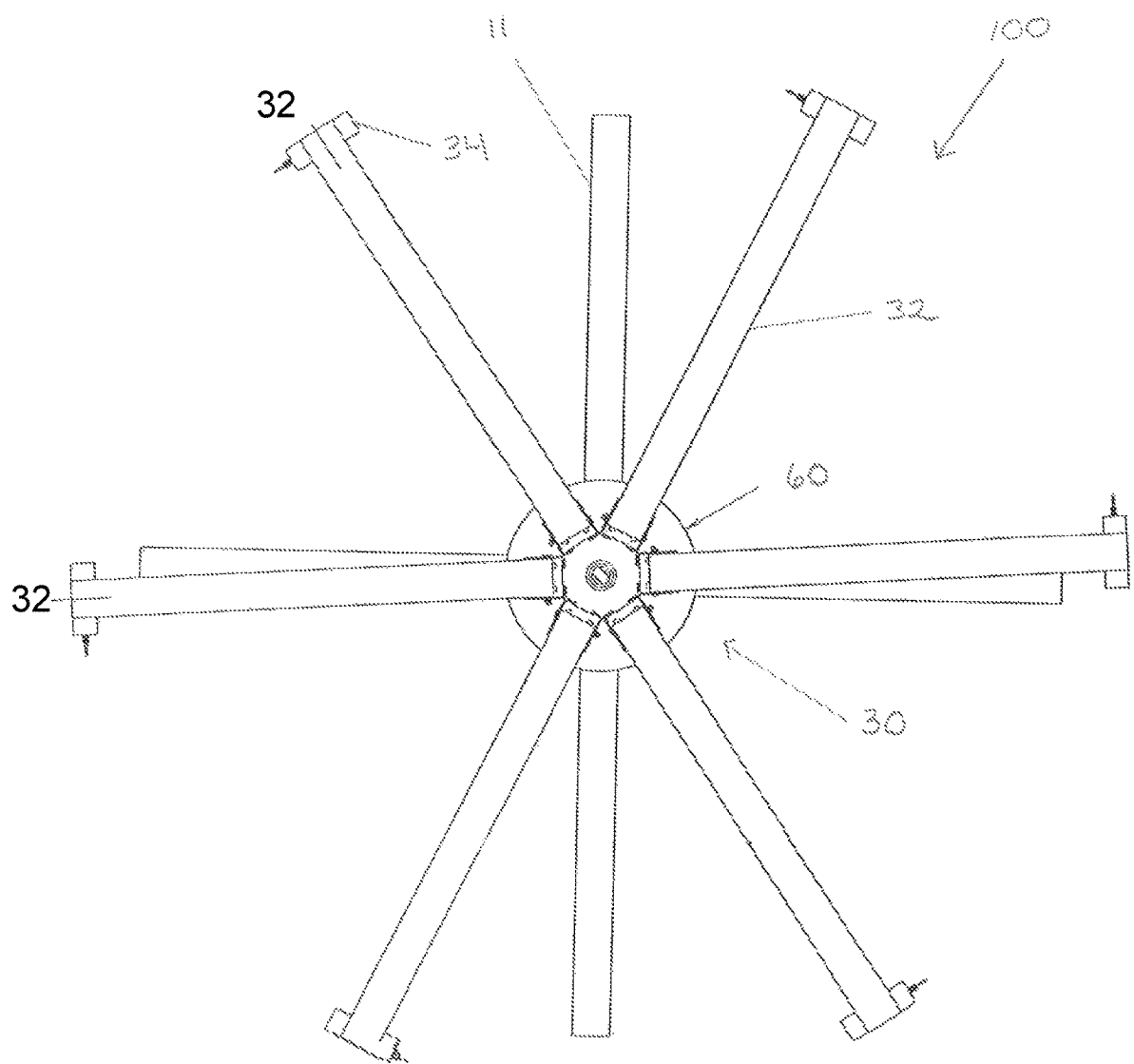

COLLAPSIBLE SCENT TRAINING WHEEL

FIELD OF THE INVENTION

Embodiments presented herein are generally directed to the training of animals to detect and respond to target scents/odors, and more particularly to an apparatus for training canines to detect and respond to scents emitted from target materials.

BACKGROUND OF THE INVENTION

Many animals, such as pigs, dogs, etc., have an acute sense of smell and are commonly used to detect "target" scents/odors, such as scents associated with drugs, explosives, biological substances, chemical substances, etc. For example, trained scent-detection dogs are generally among the most reliable means for detecting dangerous or illegal materials, chemical materials, and/or biological materials by the scents which these materials emit and have the ability to do so at extremely low concentrations.

However, before a dog (or other animal) may be employed to perform scent-based detection work, it must first be trained to use its acute sense of smell to detect target scent material in a fast, accurate and reliable manner. Presently, there are no technologies that are as accurate, fast, sensitive, mobile, and durable as the nose of a well-trained scent-detection dog.

SUMMARY OF THE INVENTION

In one aspect, a scent training wheel training animals to detect and respond to target scents is provided. The scent training wheel comprises a support base configured to be positioned on a support surface; a rotatable carousel including a top plate and a plurality of support arms extending radially outward from the top plate, wherein each support arm has a first end rotatably connected to the top plate and a second end configured to be coupled to a scent receptacle; and a hub assembly detachably mechanically coupling the rotatable carousel to the base, wherein the hub assembly is configured to permit the carousel to rotate relative to the base, wherein the connection between the first ends of each support arm and the top plate permits each of the support arms to rotate, relative to the top plate, between an open position and a collapsed storage position. In certain aspects, wherein each of the first ends of the plurality of support arms are rotatably connected to a first surface of the top plate by a respective hinge and pin arrangement.

In further aspects, the top plate includes a plurality of support arm brackets angularly spaced about an outer periphery of the top plate and configured to receive a respective first end of one of the plurality of support arms, wherein a first end of a support arm is retained in a respective support arm bracket. In certain aspects, a first end of a support arm is retained in a respective support arm bracket by a pin extending through the support arm bracket and the support arm positioned therein. In certain aspects, each angularly spaced support arm bracket includes: a first end portion and an opposing second end portion, the second end portion being adjacent the outer perimeter of the top plate, a channel defined between the first end portion and the second end portion by a first side portion, a spaced apart parallel second side portion, and a back portion structurally interconnecting the first side portion and the second side portion, and wherein the second end portion includes a flange which extends upward from the top surface and cooperates with the first and second side wall portions to receive and retain the support arm in a radially outward extended position.

In further aspects, the support base comprises: a base plate; an elongated center post extending upwardly from the base plate; and a plurality of support legs extending radially outward and slightly downward from the base plate, wherein each support leg has a first end rotatably connected to the base plate and a second end configured to be positioned on the support surface. In certain aspects, each of the first ends of the plurality of support legs are rotatably connected to a first surface of the base plate by a respective hinge and pin arrangement. In certain aspects, the base plate includes a plurality of support leg brackets angularly spaced about an outer periphery of the base plate and configured to receive a respective first end of one of the plurality of support legs, wherein a first end of a support leg is retained in a respective support leg bracket. In certain aspects, a first end of a support leg is retained in a respective support arm bracket by a pin extending through the support leg bracket and the support leg positioned therein.

In other aspects, a collapsible scent training wheel for training animals to detect and respond to target scents is provided. The scent training wheel comprises: a support base configured to be positioned on a support surface; a rotatable carousel comprising a top plate; a plurality of support arms mechanically coupled to the top plate, wherein the mechanical coupling allows each of the plurality of support arms to pivot between an open position and a closed position; and a hub assembly detachably mechanically coupling the rotatable carousel to the base, wherein the hub assembly is configured to permit the carousel to rotate relative to the base. In certain aspects, each of the plurality of support arms has a first end that is mechanically coupled to a surface of the top plate by a respective hinge and pin arrangement.

Other aspects, features and advantages of the embodiments presented herein will be apparent from the following detailed description taken in connection with the accompanying drawings, wherein like components are designated by like reference numerals.

BRIEF DESCRIPTION OF THE DRAWINGS

Embodiments of the present invention are described herein in conjunction with the accompanying drawings, in which:

FIG. 2 is a plan view of the scent training wheel of FIG. 1.

DETAILED DESCRIPTION OF THE INVENTION

The following is a detailed description of exemplary embodiments such as those illustrated in the accompany drawings. The invention should not be understood as limited to specific embodiments described below.

It is intended that the description below not be limited to terms of orientation that are used for convenience and ease of understanding. Specifically, it is to be understood that terms such as "top", "bottom", "above", "below", "front", "rear", "side", "length", "width", "transverse", "upper", "lower", "interior", "exterior", "inner", "outer" and the like, as may be used herein, merely describe points of reference and do not limit embodiment presented herein to any particular orientation or configuration.

Embodiments presented herein are generally directed to a collapsible scent training wheel for use in training a scent-detection animal. A collapsible scent training wheel in accordance with certain embodiments presented herein comprises a support base configured to be positioned on a support surface and a rotatable carousel including a top plate and a plurality of support arms extending radially outward from the top plate. Each support arm has a first end rotatably connected (hingedly attached) to the top plate and a second end configured to be coupled to a scent receptacle. The training wheel also includes a hub assembly detachably mechanically coupling the rotatable carousel to the support base, wherein the hub assembly is configured to permit the carousel to rotate relative to the base. The connection between the first ends of each support arm and the top plate permits each of the support legs to rotate relative to the base plate between an open position and a collapsed storage position. That is, each support leg is pivotable (foldable) between a radially extending open position and a closed or storage/transport position.

Further features of the collapsible scent training wheel in accordance with embodiments presented herein are provided below. For ease of illustration, the scent training wheel in accordance with embodiments presented herein are primarily described with reference to the training of canines (dogs). However, it is to be appreciated that these examples are merely illustrative and that the collapsible scent training wheel in accordance with embodiments presented herein may also be used for the training of a number of other animals.

Figure 1:
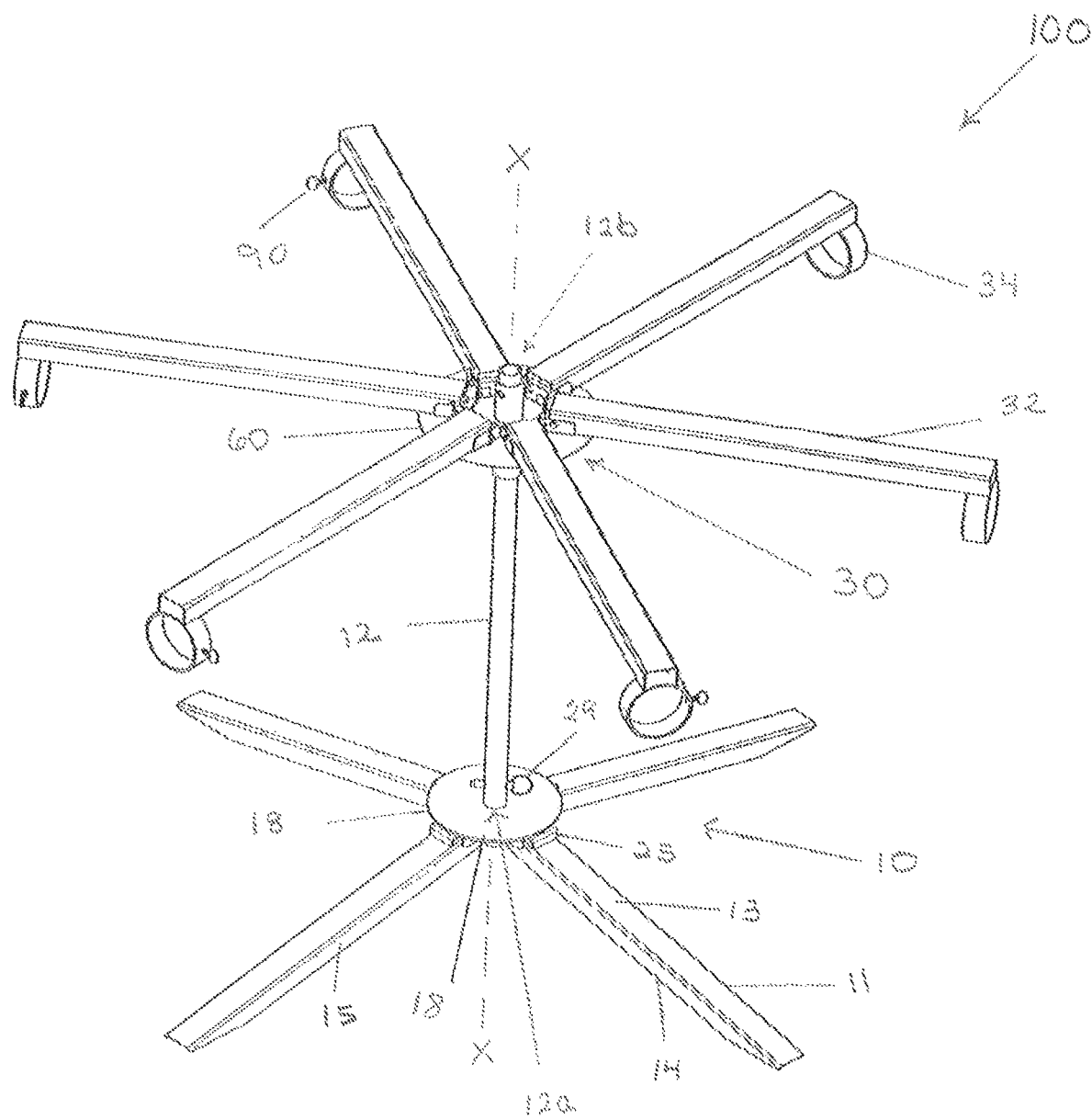
FIG. 1 is a perspective view from above of an assembled scent training wheel in accordance with certain embodiments presented herein.
Figure 3A:
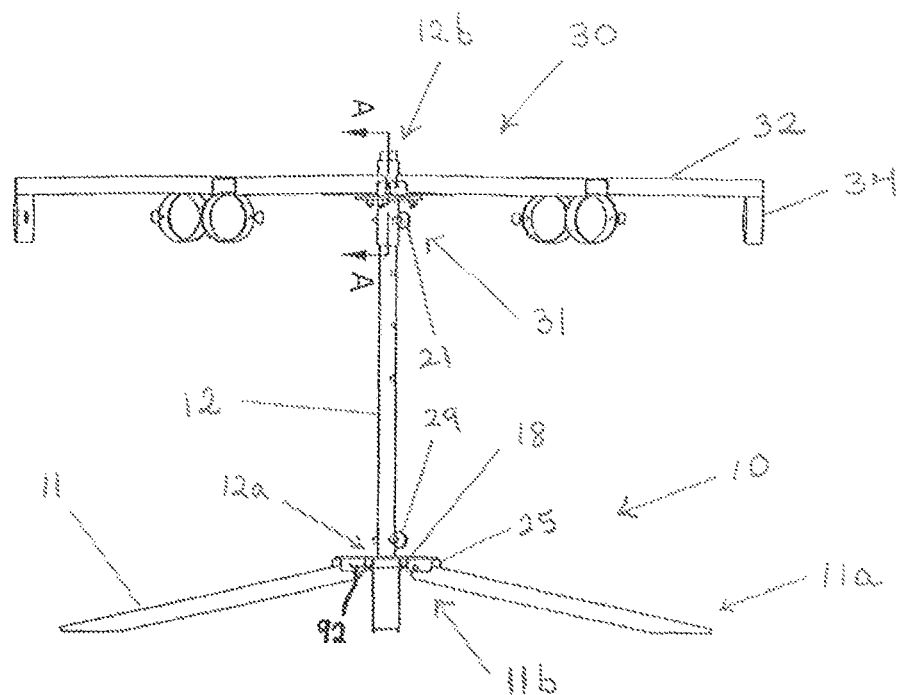
FIG. 3A is a side view in elevation of the scent training wheel of FIG. 1.

Referring first to FIGS. 1 and 3A, shown is a collapsible scent training wheel 100 in accordance with certain embodiments presented herein. As shown, collapsible scent training wheel 100 comprises a support base 10 mechanically coupled to, and configured to support, a scent training rotatable carousel 30. As described further below, the rotatable carousel 30 is coupled to the support base 10 via a hub assembly 31 (FIG. 3A-3B) which enables the rotatable carousel 30 to rotate, relative to the support base 10, about a vertical axis. The vertical axis is shown in FIG. 1 as axis X-X.

Figure 5A:
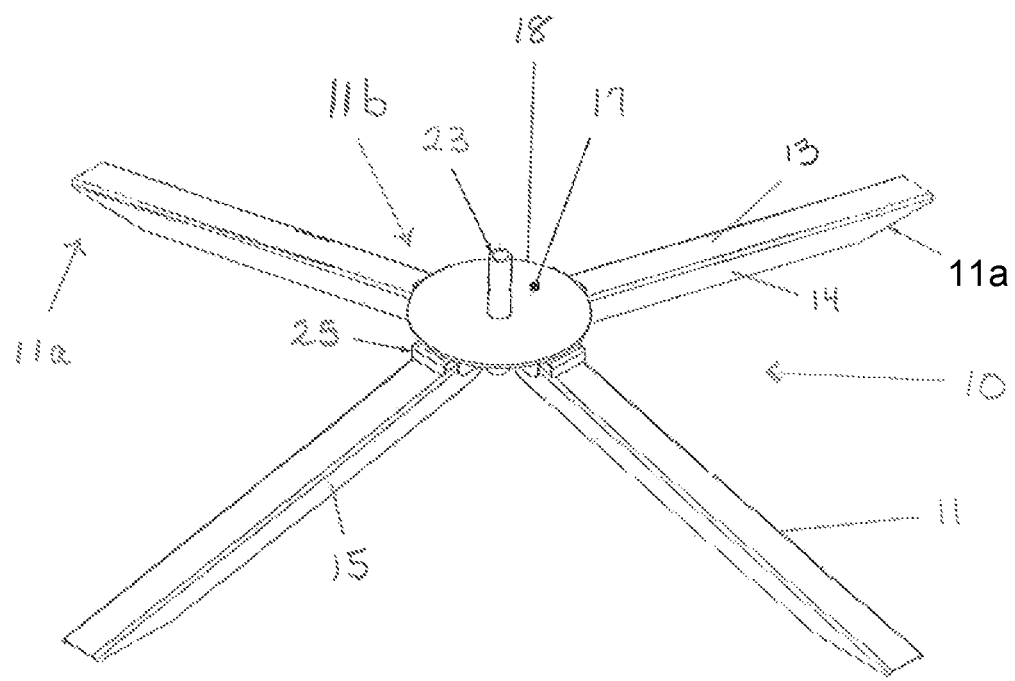
FIG. 5A is a perspective view from above, right, depicting a support base of the scent training wheel of FIG. 1 with support legs folded out to an open position in accordance with certain embodiments presented herein.

In the embodiment of the present invention illustrated in FIGS. 1, 3A, and 5A, support base 10 includes a base plate 18, four elongated (channel-shaped) support legs 11, a hub assembly 31, and an elongated cylindrical (center) post 12. The elongated cylindrical post 12 is coupled to base plate 18 and extends upward (vertically) from the base plate. The hub assembly is slidably connected to the center post 12 and supports the rotatable carousel 30 for rotation about vertical axis X-X. The channel-shaped support legs 11 are hingedly connected to the base plate 18 and extend radially outward and slightly downward from elongated center post 12 (i.e., at an angle with respect to the rotatable carousel 30) to support the scent training wheel 100 on a floor, the ground, or any other support surface (not shown) in a self-supporting and stable manner. The support legs, as well as the center post and base plate, may be fabricated from relatively lightweight, rigid material, such as, for example, aluminum or aluminum alloy. However, these components may be fabricated from other suitable non-corrosive metals or plastic materials, as well.

As best shown in FIGS. 1 and 5A, each channel-shaped support leg 11 is generally U-shaped in cross-section having a base 13 and spaced apart first and second side walls 14, 15 integrally joined to the base. As illustrated, each support leg also has a second (distal) end 11a and an opposing first (proximal) end 11b. The channel side walls 14, 15 at the distal end 11a of each support leg 11 are made to slope to the channel base 13 and the channel side walls at the proximal end 11b of each support leg 11 are drilled to have aligned pivot holes configured to receive a hinge pin 92. While the embodiment shown in FIGS. 1 and 5A illustrates four elongated support legs 11 attached to base plate 18, it is to be appreciated that the use of four support legs 11 is illustrative and that other embodiments may include more or less support legs 11, for example, five support legs or three support legs, respectively.

Figure 3B:
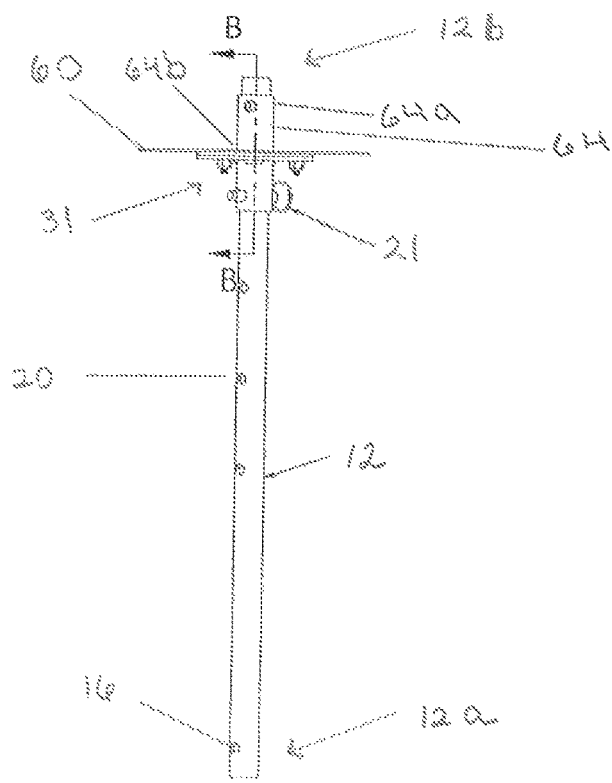
FIG. 3B is a side view in elevation depicting a rotatable carousel, without support arms and brackets, attached to the vertically extending center post of the scent training wheel of FIG. 3A in accordance with certain embodiments presented herein.

Referring to FIGS. 3A-3B, the elongated cylindrical post 12 has a distal (lower) end 12a and an opposing proximal (upper) end 12b. As used herein, the term "distal end" will always refer to the end of the post remote from rotatable carousel 30 and the term "proximal end" will always refer to the end of the post closest to the rotatable carousel. The elongated cylindrical (center) post 12 (as best shown in FIGS. 1, 2, 11 and 12) is tubular with a hollow core of generally cylindrical cross-sectional configuration that extends longitudinally from its distal (lower) end 12a to its proximal (upper) end 12b.

With reference to FIGS. 3A-3B, a pair of diametrically aligned through-holes (apertures) 16 is formed at the distal (lower) end 12a of the tubular post 12 to permit the tubular post to be fastened to the support base 10. Similarly, a plurality of pairs of diametrically aligned through-holes (apertures) 20 is formed at the proximal (upper) end 12b of the tubular post, each pair being spaced at a different distance from the edge of the proximal (upper) end which permits the hub assembly 31 to be slidably positioned at various heights, thereby enabling height adjustment of rotatable carousel 30. While each pair of holes 20 formed at the proximal (upper) end 12b of tubular post 12 is shown as being equally spaced apart, it will be recognized that other suitable spacing may be utilized, as desired.

As illustrated in FIGS. 3A-3B, a first quick release retaining pin 29 (or other suitable fastening mechanism) extends through the pair of aligned through-holes 16 at the distal (lower) end 12a to detachably retain tubular post 12 to support base 10. Similarly, a second quick release retaining pin 21 (or other suitable fastening mechanism) extends through a selected pair of aligned through-holes 20 at the proximal (upper) end 12b of tubular post 12 to detachably retain hub assembly 31, as well as rotatable carousel 30 which is supported by the hub assembly, at a selected height. Each of these features will be described in more detail below.

Figure 7A:
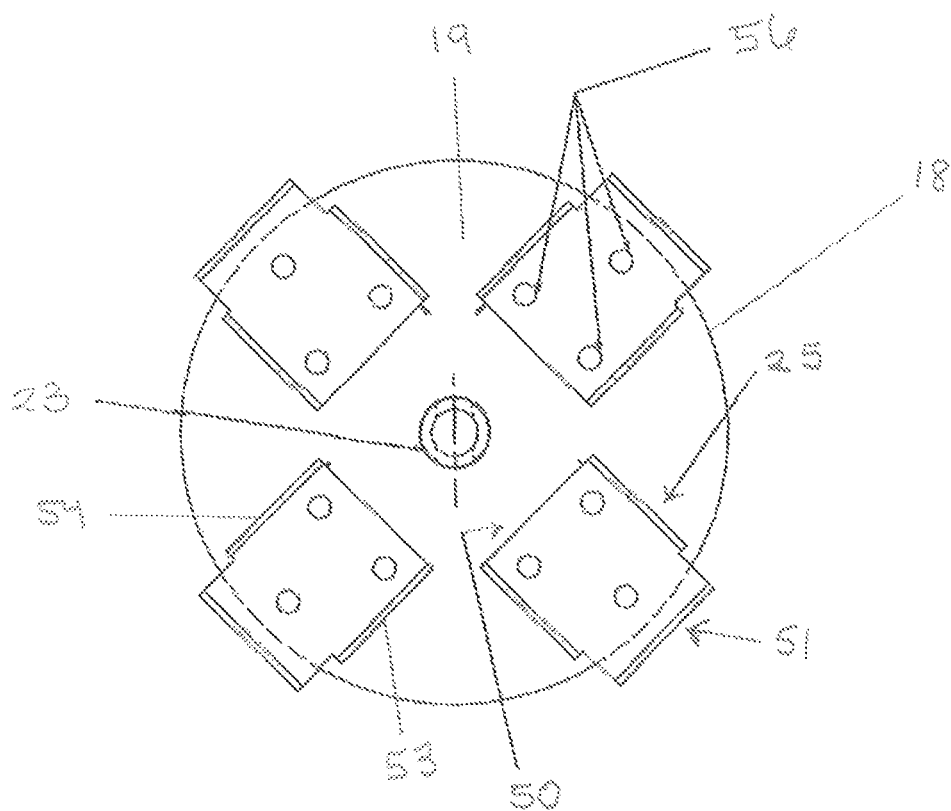
FIG. 7A is a plan view illustrating a plurality of support leg brackets and a tubular center pipe secured to a bottom plate of the support base shown in FIG. 5A in accordance with certain embodiments presented herein.
Figure 7B:
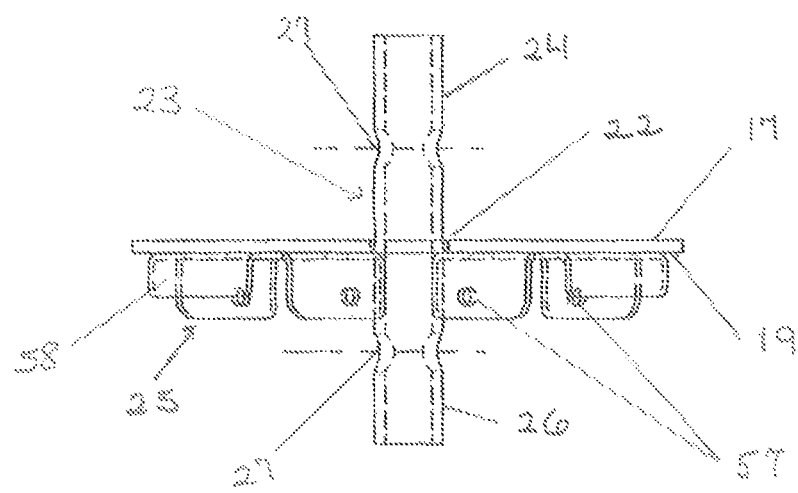
FIG. 7B is a side view in elevation of the support leg brackets and the center pipe of FIG. 7A.

With reference to FIGS. 1, 5A-5B and 7A-7B, the base plate 18 is configured as a circular plate having a first or top surface 17, a second or bottom surface 19, and a central receiving aperture or hole 22 of circular configuration extending through the plate (FIG. 7B). It will be appreciated, however, that other suitable geometric configurations may be utilized for the base plate, if desired. The base plate 18 includes a generally cylindrical, tubular center pipe 23 configured to be removably coupled to distal (lower) end 12a of elongated tubular (center) post 12, and a plurality of leg support brackets 25 located proximate the outer periphery of base plate 18, each bracket configured to receive, support and retain one of the support legs 11.

The tubular center pipe 23 has an external dimension that is slightly smaller than the dimension of circular aperture 22 to permit the center pipe to slide through aperture 22 and be firmly affixed within the aperture such that a portion (upper portion) 24 of the pipe 23 extends upward from top surface 17 and a portion (lower portion) 26 of the pipe 23 extends downward from the bottom surface 19 of base plate 18 (FIG. 7B). In the embodiment presented herein, the tubular pipe 23 is firmly affixed to base plate 18, for example, by welding the center pipe to the bottom surface of the base plate. However, it should be appreciated that any other suitable mechanism/technique may be utilized to fixedly secure the center pipe to the base plate. Further, the upper and lower pipe portions 24, 26 are generally of equal size (e.g., same length and external circumference) and each has a tubular wall including a pair of diametrically aligned through-holes 27 (FIG. 7B) extending therethrough configured to receive quick release retaining 29 (or other suitable fastening mechanism), as will be described in more detail below.

The internal dimension of elongated tubular post 12 is slightly larger than the external dimension of upper and lower pipe portions 24, 26 such that the tubular post can be slid over the upper or lower pipe portions. Once tubular post 12 is slid over either pipe portion 24, 26, through-holes 16 at distal end 12a of the tubular post may be placed in alignment with through-holes 27. Thereafter, the quick release retaining pin 29 may be inserted through the aligned holes to removably secure tubular post 12 to support base 10. Thus, support base 10 may be easily detached from tubular post 12 (or vice versa) by withdrawing quick release retaining pin 29 from the aligned through-holes to facilitate transport and storage of the scent training wheel 100.

Figure 9:
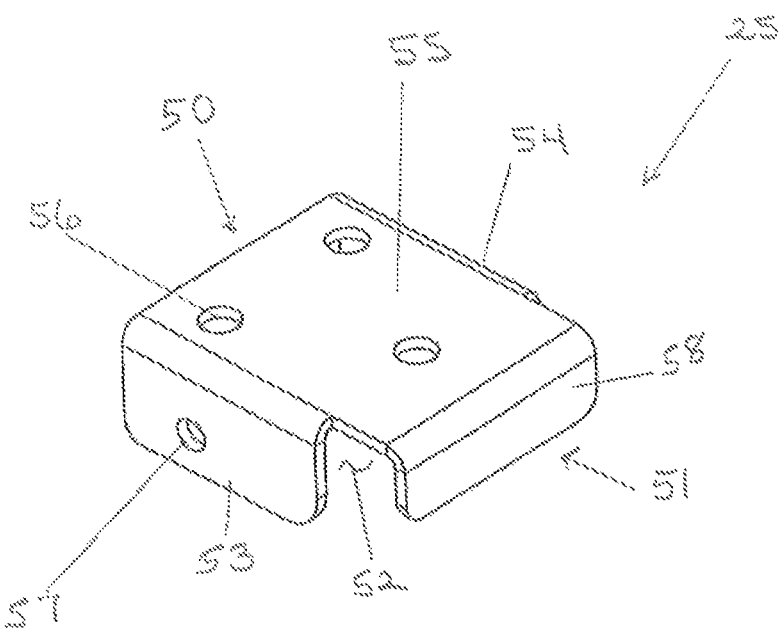
FIG. 9 is a perspective view from above, right, illustrating one of the support leg brackets of FIG. 7A.

Referring now to FIGS. 7A-7B and 9, the support leg brackets 25 are fastened to the bottom surface 19 of base plate 18 utilizing any suitable mechanism/technique, such as welding or the like. The brackets are typically equidistant, being angularly spaced about the outer periphery of base plate 18. As shown, each bracket 25 has a first end portion 50 and an opposing second end portion 51; the second end portion extending slightly beyond the perimeter of the circular base plate 18 (FIG. 7A). A channel 52 is defined between the first end portion 50 and the second end portion 51 by a first side portion 53, a spaced apart parallel second side portion 54 and a back portion 55 that structurally interconnects the first side portion 53 and the second side portion 54 along proximate elongate edge portions. The first and second side portions 53, 54 each include a through-hole 57 aligned to receive a hinge pin 92. The back portion 55 includes an array of spaced orifices 56. In an exemplary embodiment presented herein, brackets 25 may be welded to base plate 18 through orifices 56.

As illustrated in FIGS. 7B and 9, the second end portion 51 of bracket 25 includes a flange 58 which extends downward from the bottom surface 19 and cooperates with support leg 11 to maintain the leg in its slightly downward inclined position (FIGS. 1 and 3A). While the embodiment shown in FIG. 7A illustrates four support leg brackets 25 attached to base plate 18, it is to be appreciated that the use of four brackets is illustrative and that more or less brackets may be utilized; the number of brackets typically depending on the number of support legs 11 being utilized to support scent training wheel 10 in a self-supporting, stable manner.

Figure 4A:
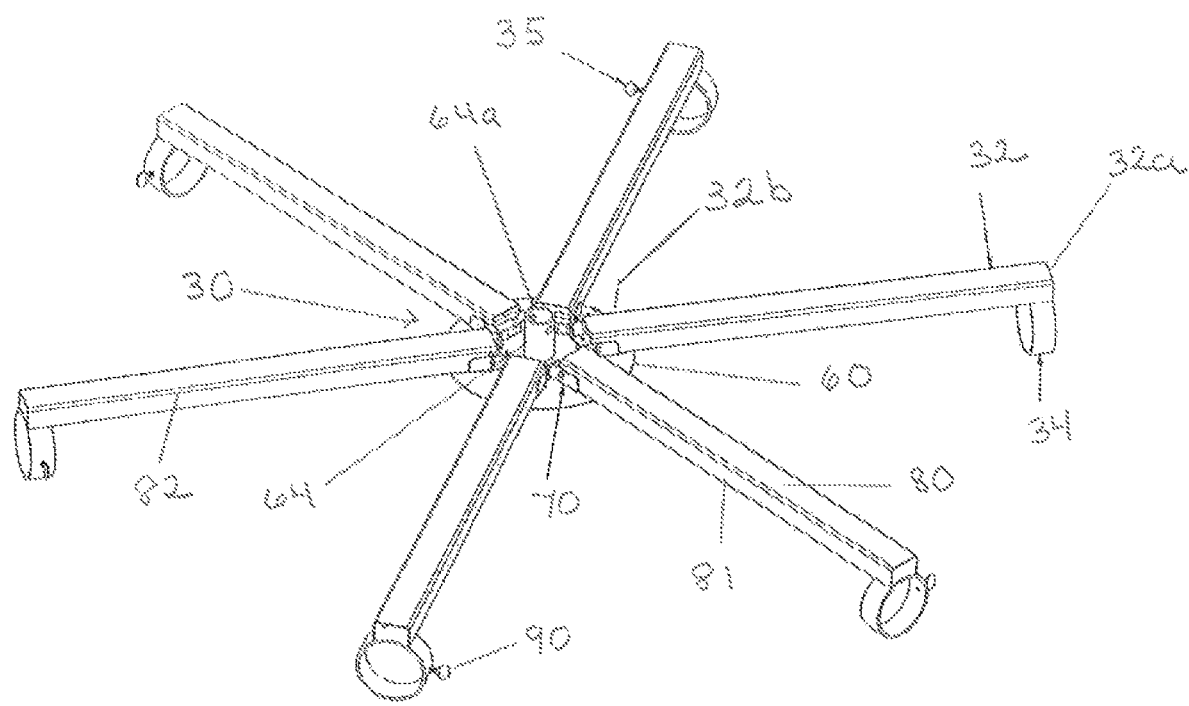
FIG. 4A is a perspective view from above, right, depicting a rotatable carousel of the scent training wheel of FIG. 1 with support arms folded out to an open position in accordance with certain embodiments presented herein.

In the embodiment of the present invention illustrated in FIGS. 1, 2 and 4A, the rotatable carousel 30 comprises a top plate 60 which is coupled to a plurality of (e.g., six) elongated (channel-shaped) radially extending support arms 32, where each arm is coupled to a corresponding scent receptacle (e.g., a cup—not shown). In the illustrative examples, each support arm 32 includes a corresponding ring-shaped sleeve member 34 that is configured to receive or mate with a corresponding cup. Each ring-shaped sleeve member 34 includes a threaded through-aperture for receiving a threaded fastener 90 such as, for example, a threaded thumb screw, as shown FIGS. 1 and 4A. The rotatable carousel 30 may be fabricated from, for example, aluminum, stainless steel, etc., and the scent receptacles (not illustrated) may be, for example, a stainless steel or aluminum cup. The ring-shaped sleeve member 34, as well as the scent receptacles (cups) are described in more detail in applicant's co-pending patent application Ser. No. 15/582,921, the disclosure of which is hereby incorporated herein by reference in its entirety.

Figure 11:
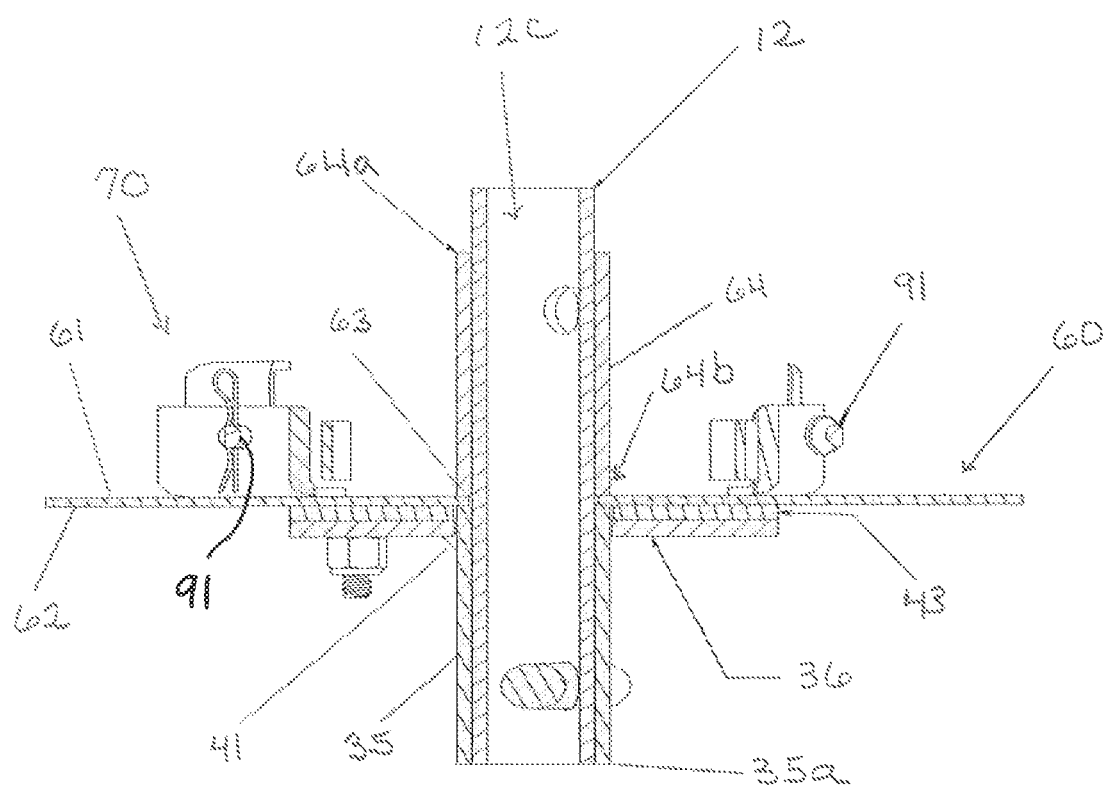
FIG. 11 is a sectional view of the hub assembly and top plate, with support arm brackets attached, taken along line A-A of FIG. 3A.

As further illustrated in FIG. 4A, each channel-shaped support arm 32 is generally U-shaped in cross-section having a base 80 and spaced apart first and second side walls 81, 82 integrally joined to the base. As shown, each arm also has a second (distal) end 32a and an opposing first (proximal) end 32b. The channel side walls 81, 82 at the distal end 32a of each arm 32 are coupled to ring-shaped sleeve member 34 and the channel side walls at the proximal end 32b of each arm 32 are drilled to have aligned pivot holes configured to receive a hinge pin 91 (FIG. 11). While the embodiment shown in FIGS. 1 and 4A illustrates six radially extending support arms 32 attached to top plate 60 of the rotatable carousel, it is to be appreciated that the use of six support arms is illustrative and that other embodiments may include different numbers of arms, for example (but not limited to), up to twelve radially extending support arms 32. It is also to be appreciated that only a subset of available support arms 32 may be used at a given time (e.g., less arms may be used for less experienced animals).

In accordance with the embodiment illustrated in FIGS. 3A-3B, 11 and 12, the top plate 60, which is configured as a circular plate, rests on a hub or collar assembly 31 attached to the proximal (upper) end 12b of elongated tubular (center) post 12. The hub (collar) assembly 31 includes a number of components which permits the hub (collar) to be detachably coupled to the proximal (upper) end 12b of elongated tubular post 12, while allowing rotatable carousel 30 to be smoothly rotated about rotation axis X-X, which axis coincides with the longitudinal axis of elongated tubular post 12 (FIG. 1), as will be described in more detail below.

Figure 10A:
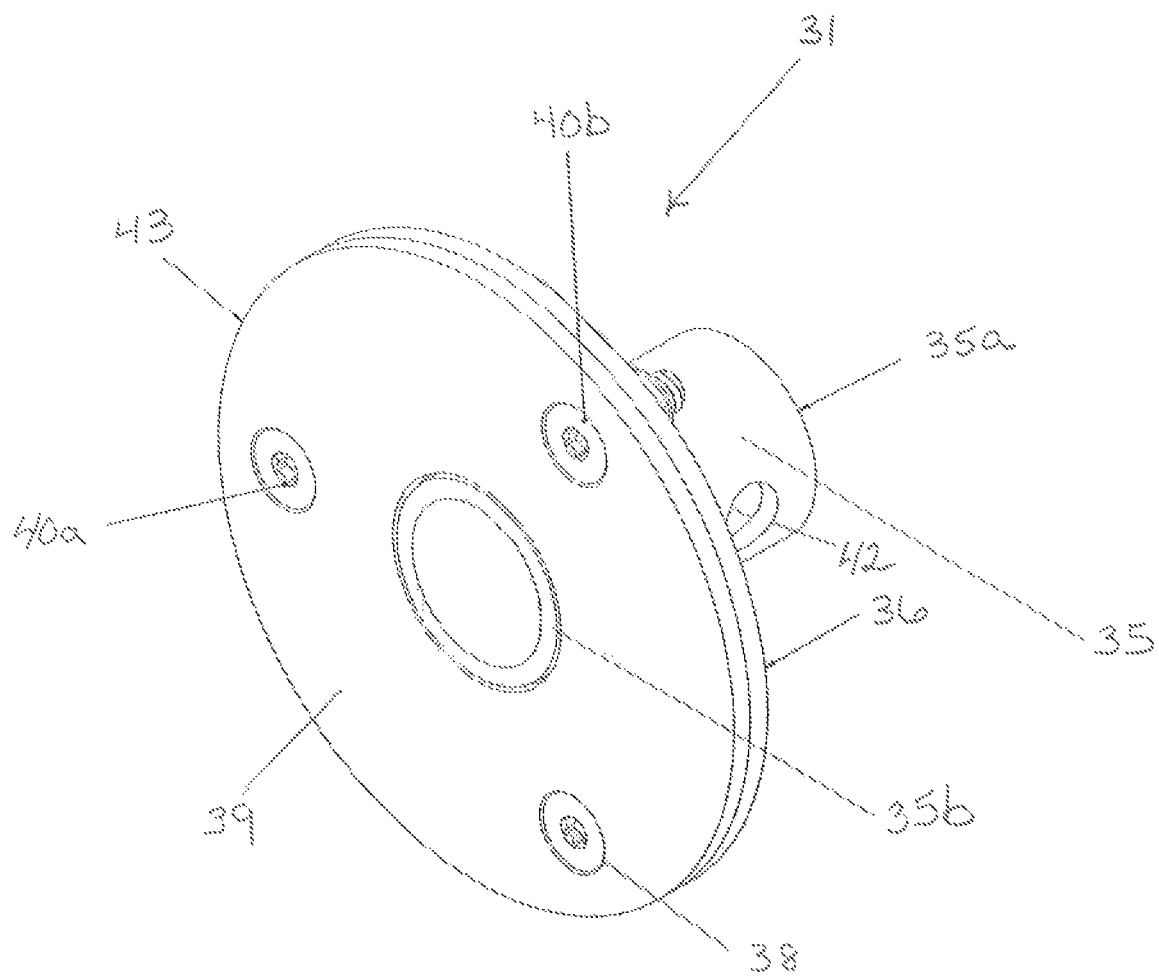
FIG. 10A is a perspective view from above, left, of an assembled hub assembly in accordance with certain embodiments presented herein.
Figure 10B:
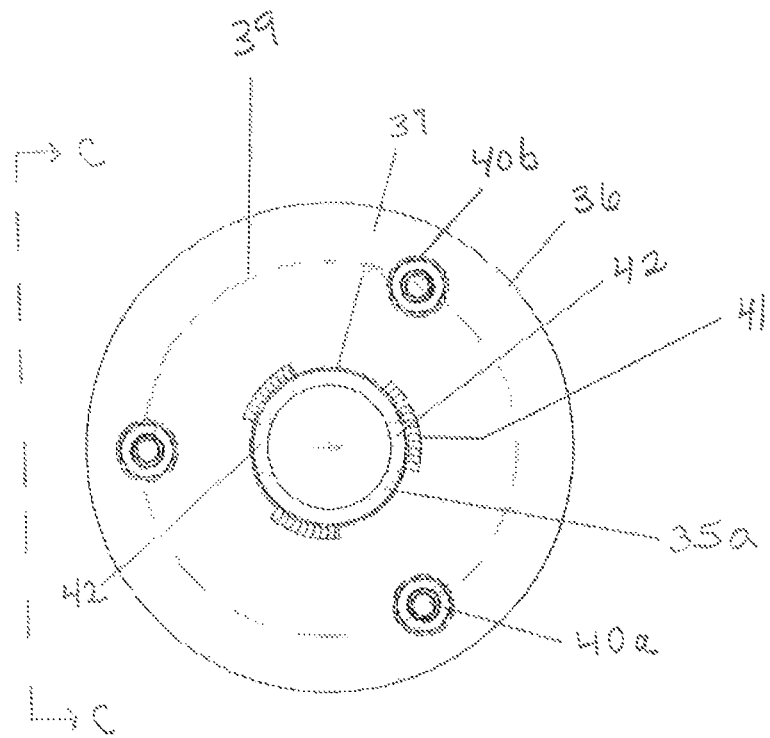
FIG. 10B is a top view of the hub assembly of FIG. 10A.
Figure 10C:
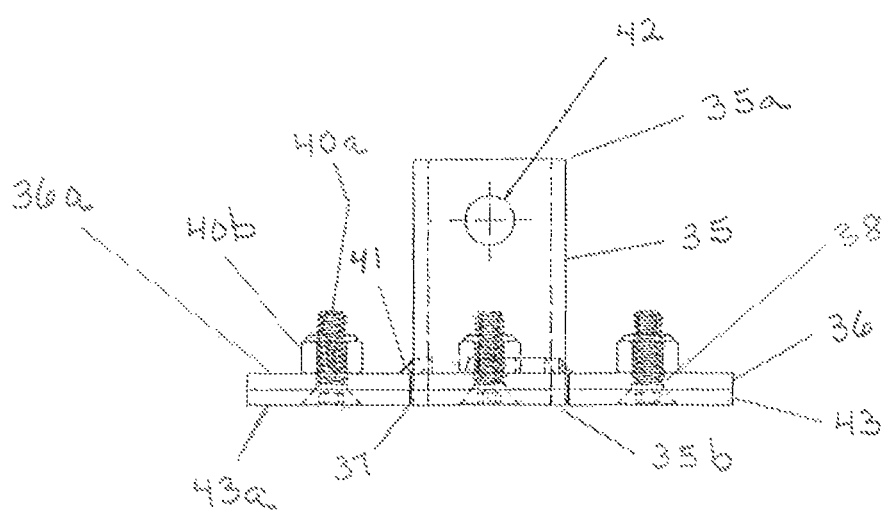
FIG. 10C is a side view in elevation of the hub assembly, taken along line C-C of FIG. 10B.

Referring now to FIGS. 10A-10C, the hub (collar) assembly 31 includes a hollow core tubular hub pipe 35, an annular shoulder plate 36, and an annular washer (rider) plate 43. The tubular hub pipe 35 has, for example, a cylindrical configuration and axially opposed distal and proximal ends 35a, 35b. As shown, shoulder plate 36 and washer plate 43 each have a body portion formed with a substantially circular central hub pipe receiving aperture 37 and an array of substantially similar equally spaced through-holes 38 of circular configuration positioned on a reference circle 39 extending about hub pipe receiving aperture 37. When the hub (collar) assembly 31 is in its assembled configuration, the washer plate 43 is disposed on shoulder plate 36 and the array of through-holes 38 in shoulder plate 36 is alignable with the array of through-holes 38 in washer (rider) plate 43 to receive screws/bolts 40a and locknuts 40b (or other suitable locking devices) to securely fasten the plates together (FIG. 10C). In certain examples, the screws/bolts 40a may comprise conical flat head screws/bolts and the locknuts 40b may comprise nylon-insert locknuts. As further illustrated in FIGS. 10A and 10C, the through-holes 38 in at least washer plate 43 may be enlarged by a countersink (not shown) so that the head of screws/bolts 40a can be sunk below the top surface 43a of the washer plate to preclude any interference with the rotation of rotatable carousel 30, as will be described in more detail below.

Furthermore, while shoulder plate 36 and washer (rider) plate 43 illustrated in FIGS. 10A-10C are shown to have three equally spaced apart screw/bolt receiving through-holes 38, it is to be appreciated that any other suitable number of receiving holes 38 may be used. Furthermore, shoulder plate 36, as well as tubular hub pipe 35, may be fabricated from a suitably strong and rigid material, such as a metal (e.g., aluminum, aluminum alloy, stainless steel, etc.), while washer (rider) plate 43 may be fabricated from a plastic material (to be described below). However, the shoulder plate and tubular hub pipe may be fabricated from any other suitable material, including (but not limited to) plastic, fiberglass and composite material, if desired.

In accordance with embodiments presented herein, the hollow tubular hub pipe 35 has an outer diameter which is slightly less than the diameter of central aperture 37 in shoulder plate 36 and washer plate 43 such that tubular hub pipe 35 may fit concentrically within the central apertures (FIG. 10C). As illustrated in FIG. 10C, the hub pipe 35 extends into the central apertures 37 of the shoulder plate and the washer plate until proximal end 35b of the hub pipe is flush with top surface 43a of washer plate 43. The hub pipe 35 is affixed to bottom surface 36a of shoulder plate 36 by one or more weld joints 41 (or other suitable fastening mechanism); thus it is integral with the latter (FIGS. 10B-10C). The opposite distal end 35a of hub pipe 35 is provided with a pair of diametrically aligned holes 42 extending through the tubular wall of the hub pipe (FIGS. 3A-3B and 10A-10B). The through-holes 42 have a similar configuration as through-holes (apertures) 20 in elongated tubular post 12 to receive quick release pin 21 (FIGS. 3A-3B). The inner diameter of hollow tubular hub pipe 35 (FIGS. 11-12) has a slightly larger dimension than the outer (outside) diameter of elongated tubular post 12 to permit sliding insertion of tubular post 12 into the interior of tubular hub pipe 35. The diametrically aligned holes 42 of hub pipe 35 are selectively registrable with pairs of diametrically aligned apertures 20 of tubular post 12 at different adjusted heights of the hub (collar) assembly 31. Upon selective registration of aligned holes 42 with aligned apertures 20, the quick release pin 21 is insertable through the paired holes/apertures to secure hub (collar) assembly 31 to support base 10 and permit rotatable carousel 30, which rests on the hub (collar) assembly, to be raised and lowered to accommodate scent-detection animals (e.g., canines) of differing height.

As mentioned above, the washer/rider plate 43 is fabricated from plastic material such as, for example, a thermoplastic polymer resin (e.g., polyoxymethylene (POM), also known as acetal, polyacetal and polyformaldehyde). The inventors have found that fabricating the washer (rider) plate from thermoplastic polymer resin, such as (but not limited to) polyoxymethylene (POM), provides a precision, high-performance component having the characteristics of high stiffness, low friction, and excellent dimensional stability. Moreover, the inventors have found that fabricating rider plate 43 of thermoplastic polymer resin enables the rotatable carousel 30 to smoothly rotate about vertical tubular post 12 with reduced friction without requiring lubrication or ball bearings.

Referring again to FIGS. 1-2, as well as FIGS. 4A-4B, 11 and 12, the rotatable carousel 30 includes a circular top plate 60 which rests directly on washer/rider plate 43 of hub (collar) assembly 31. The hub assembly is attachable to the proximal (upper) end 12b of elongated tubular center post 12. The top plate 60 is coupled to a plurality of elongated radially extending support arms 32 and each arm is coupled to a corresponding scent receptacle (e.g., a cup—not shown) via a corresponding ring-shaped sleeve member 34, as shown and described in more detail in applicant's co-pending application Ser. No. 15/582,921, the disclosure of which is hereby incorporated herein by reference in its entirety.

Figure 6A:
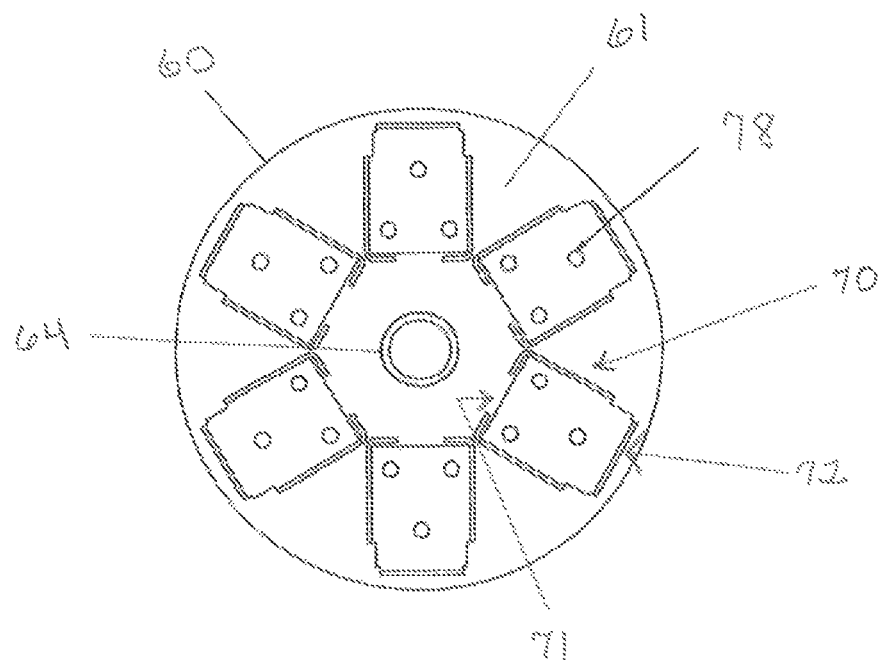
FIG. 6A is a plan view illustrating a plurality of support arm brackets and a tubular pipe-shaped collar secured to a top plate of the rotatable carousel shown in FIG. 4A in accordance with certain embodiments presented herein.
Figure 12:
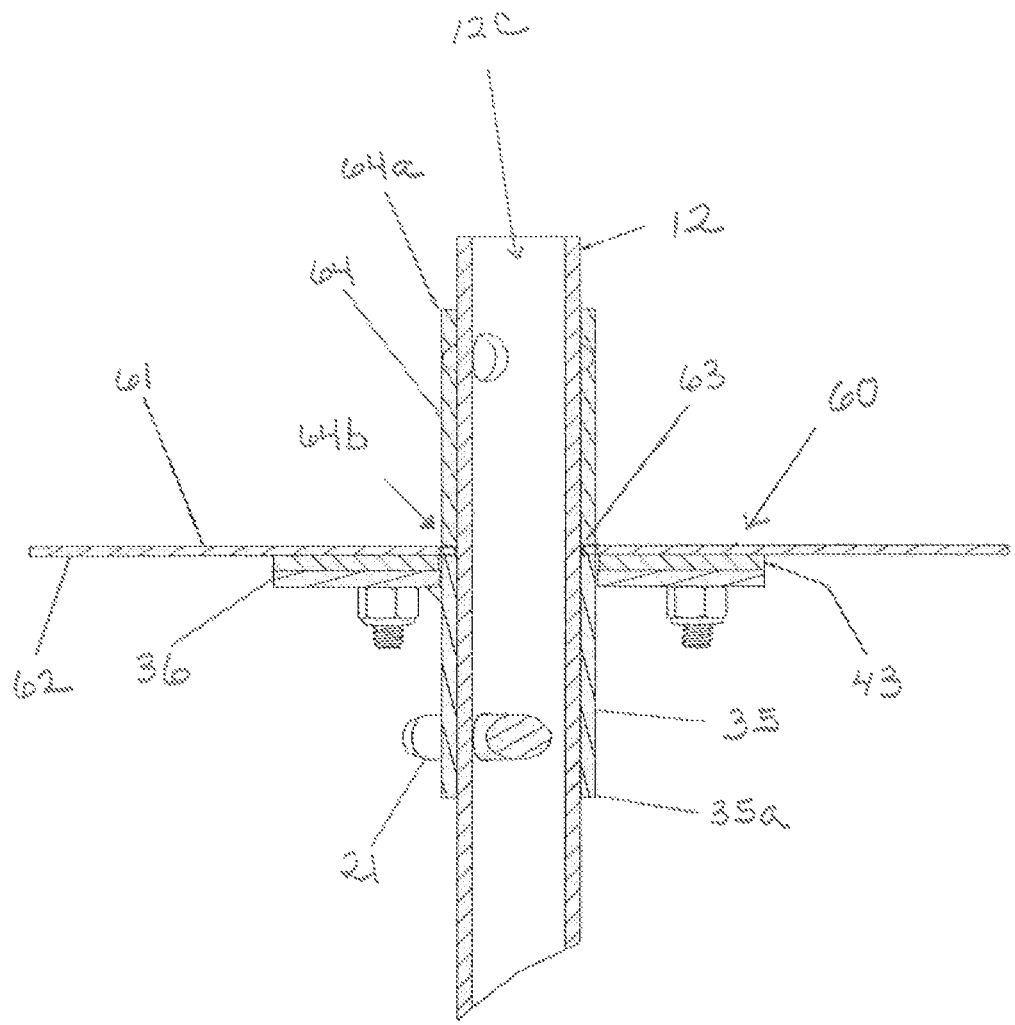
FIG. 12 is a sectional view of the hub assembly and top plate, with support arm brackets removed, taken along line B-B of FIG. 3B.

With reference to FIGS. 6A, 11 and 12, the circular top plate 60 has a first or top surface 61, a second or bottom surface 62, and a central receiving aperture or hole 63 of a circular configuration extending through the plate. The central receiving aperture (hole) 63 is dimensioned to slidably receive the proximal (upper) end 12b of the upright (vertical) elongated tubular post 12. It will be appreciated, however, that the top plate may have other suitable geometric configurations if desired. The top plate 60 includes a generally cylindrical, tubular pipe-shaped collar 64 configured to be rotatably coupled to the proximal (upper) end 12b of elongated tubular post 12, and a plurality of support arm brackets 70 located proximate the outer periphery of top plate 60, each bracket configured to receive, support and retain one of the support arms 32.

The generally cylindrical, tubular pipe-shaped collar 64 has axially opposed first and second ends 64a, 64b (FIGS. 6B and 11-12) and a hollow core of generally circular configuration having a dimension that is substantially the same as the dimension of the central receiving aperture (hole) 63 to slidably receive the proximal (upper) end 12b of the upright (vertical) elongated tubular post 12 (FIGS. 11-12). In the embodiment presented herein, the pipe-shaped collar 64 is firmly affixed to the top plate 60 at its second end 64b by, for example (but not limited to), welding the pipe-shaped collar to the top surface 61 of the plate. However, it is to be appreciated that any other suitable mechanism/technique may be utilized to fixedly secure the pipe-shaped collar to the top plate. Moreover, as shown in FIGS. 4A and 6A-6B, the first end 64a of the pipe-shaped collar can have a pair of diametrically aligned through-holes 65 of circular configuration formed therein, as will be described in more detail below.

Figure 6B:
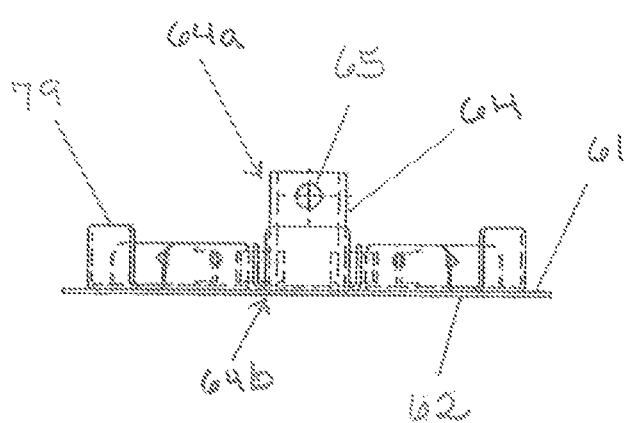
FIG. 6B is a side view in elevation of the support arm brackets and the pipe-shaped collar of FIG. 3B.
Figure 8:
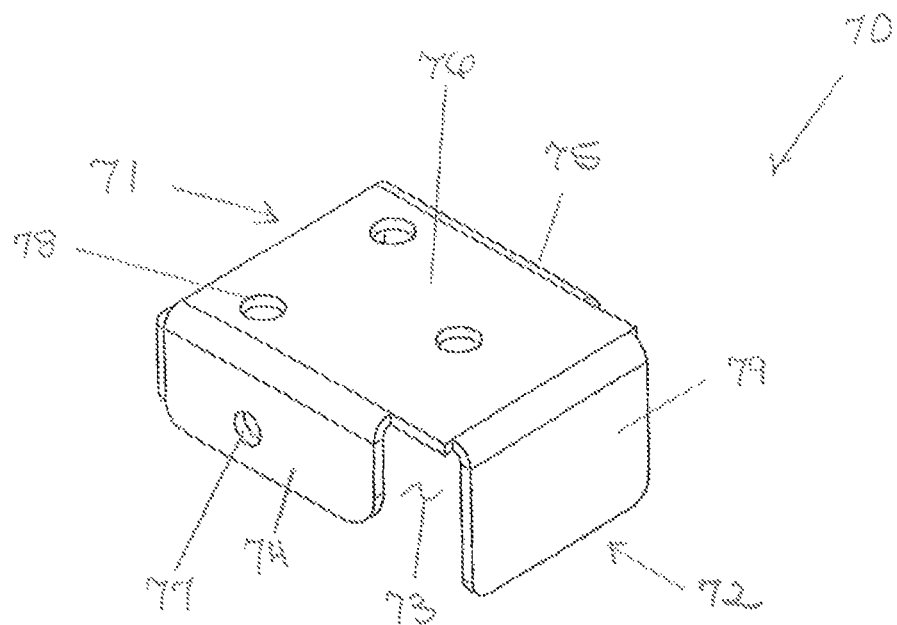
FIG. 8 is a perspective view from above, right, illustrating one of the support arm brackets of FIG. 6A.

Referring now to FIGS. 6A-6B and 8, the support arm brackets 70 are fastened to the top surface 61 of top plate 60 utilizing any suitable mechanism/technique, such as (but not limited to) welding or the like. The brackets are typically equidistant, being angularly spaced about the outer periphery of top plate 60. As shown, each bracket 70 has a first end portion 71 and an opposing second end portion 72; the second end portion being adjacent the perimeter of the circular top plate 60 (FIG. 6A). A channel 73 is defined between the first end portion 71 and the second end portion 72 by a first side portion 74, a spaced apart parallel second side portion 75 and a back portion 76 that structurally interconnects the first side portion 74 and the second side portion 75 along proximate elongate edge portions. The first and second side portions 74, 75 each include a through-hole 77 aligned to receive a hinge pin 91 (FIG. 11). The back portion 76 includes an array of spaced orifices 78. In the exemplary embodiment presented herein, support arm brackets 70 may be welded to top plate 60 through orifices 78.

As illustrated in FIGS. 6B and 8, the second end portion 72 includes a flange 79 which extends upward from top surface 61 and cooperates with the first and second side wall portions 81, 82 of support arm 32 to maintain the support arm in its radially outward extended position (FIGS. 1-3A and 4A). While the embodiment shown in FIG. 6A illustrates six support arm brackets 70 attached to top plate 60, it is to be appreciated that the use of six brackets is illustrative and that more or less brackets may be utilized; the number of brackets typically depending on the number of support arms 32 being utilized to train the scent-detection animals (e.g., canines) as described in more detail in applicant's co-pending patent application Ser. No. 15/582,921, the disclosure of which is hereby incorporated herein by reference in its entirety.

Use and operation of the scent training wheel 100 is believed to be apparent from the above description. Nevertheless, a brief explanation of the use and operation of the scent training wheel will be provided below.

At the outset, the various parts of scent training wheel 100 are assembled. As illustrated in FIGS. 1 and 3, the channel-shaped support legs 11 and the elongated tubular (center) post 12 are attached to base plate 18, and the channel-shaped support arms 32 are connected to top plate 60.

Specifically, the support legs 11 are hingedly coupled to the support leg brackets 25 located on base plate 18 by positioning the proximal end 11b of the channel-shaped support legs between the first and second side wall portions 53, 54 of the brackets, aligning the pivot holes (not shown) in the channel-shaped support legs with through-holes 57 in brackets 25 and, thereafter, pivotally interconnecting each component using a hinge pin 92 that extends through the aligned holes. After interconnecting the legs and brackets, legs 11 are folded (rotated) out to their open position, as shown in FIG. 5A, and placed on a floor, the ground, or other support surface.

More specifically, in certain embodiments, the combination of a support leg bracket 25 and a hinge pin 92 is referred to as a hinge and pin arrangement that mechanically couples the support legs 11 to the base plate 18 (e.g., a first end of a support leg 11 is retained in a respective support leg bracket 25 by the hinge pin 92 extending through holes in the support leg bracket 25 and the holes in the support leg 11 positioned in the respective bracket 25). These hinge and pin arrangements permit each of the support legs 11 to rotate, relative to the base plate 18, between an open position and a collapsed (storage/transport) position. In the open position, the support legs 11 may extend outward from the base plate 18 at an acute angle, while in the collapsed position the support legs 11 may extend substantially orthogonal to the bottom surface of the base plate 18.

Similarly, support arms 32 are hingedly coupled to the support arm brackets 70 located on top plate 60 by positioning the proximal end 32b of the channel-shaped support arms between the first and second side wall portions 74, 75 of the brackets, aligning the pivot holes (not shown) in the channel-shaped support arms with through-holes 77 in brackets 70 and, thereafter, pivotally interconnecting each component using a hinge pin (e.g., exemplary hinge pin 91—shown in FIG. 11) that extends through the aligned holes. After interconnecting the arms and brackets, arms 32 are folded (rotated) out to their radially extending open position, as shown in FIG. 4A.

More specifically, in certain embodiments, the combination of a support arm bracket 70 and a hinge pin 91 is referred to as a hinge and pin arrangement that mechanically couples the support arms 32 to the top plate 60 (e.g., a first end of a support arm 32 is retained in a respective support arm bracket 70 by the hinge pin 91 extending through holes in the support arm bracket 70 and the holes in the support arm 32 positioned in the respective bracket 70). These hinge and pin arrangements permit each of the support arms 32 to rotate, relative to the top plate 60, between an open position and a collapsed (storage/transport) position. In the open position, the support arms 32 may extend radially outward from the top plate 60 (e.g., substantially parallel to a top surface of the top plate), while in the collapsed position the support arms 32 may extend substantially orthogonal to the top surface of the top plate 60.

The elongated tubular (center) post 12 is coupled to base plate 18. Specifically, the tubular post 12 is positioned in its vertical, upward extending position and distal end 12a is slid onto the upstanding portion 24 of tubular center pipe 23. The through-holes 16 in tubular post 12 are then aligned with through-holes 27 in upper portion 24 of tubular center pipe 23 and quick release retaining pin 29 is inserted through the aligned holes to releasably secure tubular post 12 to base plate 18, as shown in FIG. 3.

After tubular post 12 is secured to base plate 18, hub (collar) assembly 31 is detachably coupled to proximal end 12b of tubular post 12. Specifically, tubular hub pipe 35 of hub (collar) assembly 31 is slid onto the proximal (upper) end 12b of tubular post 12 with top surface 43a of washer (rider) plate 43 facing upward and adjusted to a selected height by positioning diametrically aligned holes 42 in registration with a pair of diametrically aligned holes 20. Once holes 20, 42 are in registration, quick release retaining pin 21 is inserted through the aligned holes to securely affix hub (collar) assembly 31 to support base 10 such that the selected height is maintained, as shown in FIG. 3B. The coupling of hub assembly 31 to tubular post 12 in this manner provides a positive locking connection that cannot slip.

Nevertheless, the selected height of hub (collar) assembly 31 may be changed by withdrawing retaining pin 21 completely from the tubular post holes 20 and slidably raising or lowering the hub assembly to a new adjusted height. After the hub assembly is positioned at the new adjusted height and aligned holes 42 in hub pipe 35 are in registration with a new pair of aligned holes 20 in tubular post 12, retaining pin 21 is reinserted through the registered holes to again maintain the selected height and provide a positive non-slip locking connection.

After the aforementioned parts of support base 10 are assembled, the rotatable carousel 30 may be coupled to the top plate for rotation relative to the support base 10 about vertical axis X-X, as shown in FIG. 1. Specifically, the central receiving aperture (hole) 63 in top plate 60 of the rotatable carousel is positioned over proximal (upper) end 12b of elongated tubular post 12 and the rotatable carousel is slid downward until bottom surface 62 of the top plate comes to rest directly on top surface 43a of washer (rider) plate 43. Once rotatable carousel 30 is properly positioned on the hub (collar) assembly 31, a trainer/handler may manually spin the carousel such that the carousel can freely and smoothly rotate with respect to support base 10 about vertical axis X-X. Since scent holding receptacles (not shown but discussed in applicant's co-pending application noted above) are coupled to distal end 32a of the support arms and contain hidden target scent material, as well as non-target scent material, spinning rotatable carousel 30 simultaneously rotates the receptacles to various random locations, which permits a canine being trained to walk around the wheel and sniff for scents emitted from the target and non-target scent material hidden within one or more of the receptacles.

Figure 4B:
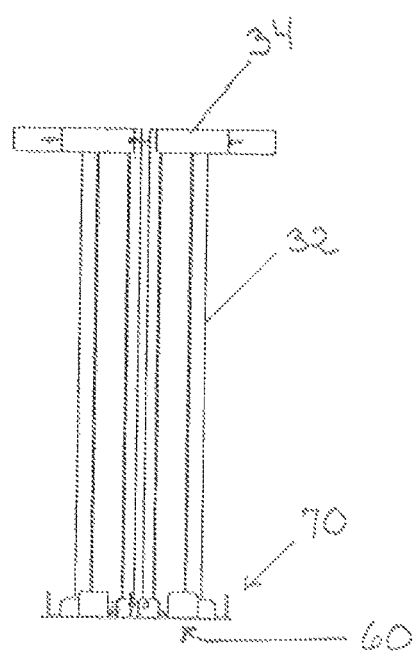
FIG. 4B is a side view in elevation illustrating the rotatable carousel of FIG. 4A with support arms folded to a collapsed storage/transport position in accordance with certain embodiments presented herein.

After a training session has been completed, the scent training wheel 100 may be disassemble for storage and/or transport. Specifically, the top plate 60 of rotatable carousel 30 is slid off the proximal (upper) end 12b of elongated tubular (center) post 12, the top plate (carousel) is inverted and channel-shaped support arms 32 are rotated downward to a folded (collapsed) storage/transport position orthogonal to the top surface of top plate 60, as shown in FIG. 4B. Thereafter, top plate 60 with support arms 32 in a folded (collapsed) storage/transport position is slid back onto the tubular post.

In certain embodiments, after the top plate back is slid back onto the proximal (upper) end of tubular post 12, through-holes 65 in tubular pipe-shaped collar 64 may be aligned with a pair of through-holes 20 (for example, but not limited to, the through-holes closest to the edge of the proximal, upper end), and quick release retaining pin 21 may be inserted therein to secure the rotatable carousel to the tubular post for storage and/or transport purposes.

Figure 5B:
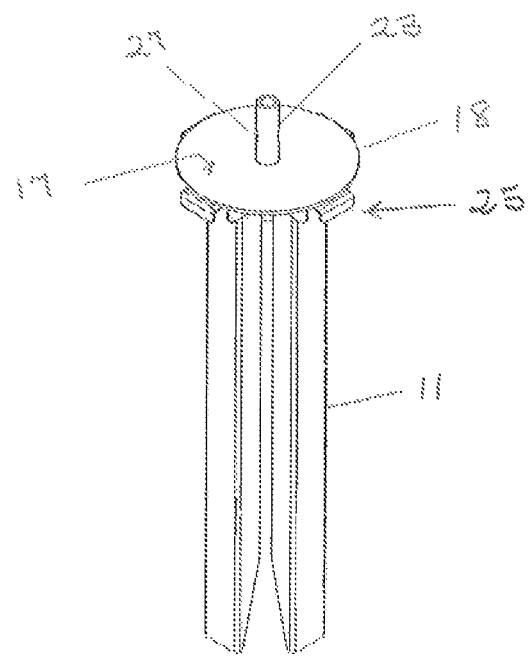
FIG. 5B is a perspective view from above, right, illustrating the support base of FIG. 5A with legs folded to a collapsed storage/transport position in accordance with certain embodiments presented herein.

Similarly, after removal of quick retaining pin 29, the upper portion 24 of tubular pipe 23 (affixed to base plate 18) is withdrawn from distal (lower) end 12b of elongated tubular post 12, the base plate is inverted, and lower portion 26 of tubular pipe 23 is inserted into distal (lower) end 12b of the elongated tubular post so that channel-shaped support legs 11 can be rotated upward to a folded (collapsed) storage/transport position orthogonal to the bottom surface of base plate 18, as shown in FIG. 5B.

In certain embodiments, after the lower portion 26 of tubular pipe 23 is slid into the distal (lower) end of tubular post 12, through-holes 27 in lower portion 26 may be aligned with through-holes 16, and quick release retaining pin 29 may be inserted therein to secure support base 10 to the tubular post for storage and/or transport purposes.

In certain embodiments, a strap or cord, for example (but not limited to), a bungee cord (not illustrated) may be wrapped around the collapsed support arms and the collapsed support legs to maintain each of them in their respective collapsed storage/transport position.

Although a specific order of assembling and disassembling the above described parts of scent training wheel 100 has been described, it should be appreciated that the aforementioned order of assembly and disassembly of the scent training wheel parts is merely illustrative and that other embodiments of the scent training wheel may be assembled and disassembled in a different order, as desired.

In summary, the scent training wheel as described above may be particularly useful for performing target scent "imprinting" in animals. In certain examples, scent training wheel 100 may be useful for not only imprinting an animal on novel scents but may be useful for ongoing training of an animal to strengthen and maintain a target scent/reward association. The target scent source material may comprise any material that provides or replicates a scent that the user would like an animal to eventually learn to detect. In general, the target scent source material is configured to release/emit airborne scent molecules into the vicinity of the receptacle (cup). The material may be any material that gives off a scent/odor that an animal can perceive. The scent (odor) given off by the material may include, for example, narcotic scents, explosives scents, chemical and biological agent scents, as well as currency scents, foodstuff scents, insect scents, cancer cell scents, etc.

As noted, the specific training examples provided above are merely illustrative. The scent training wheel in accordance with embodiments presented herein may be modified to train other animals for target scent identification. Additionally, scent training wheels in accordance with embodiments presented herein may have different shapes and sizes. As such, the invention described and claimed herein is not to be limited in scope by the specific embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. Also, it is understood that various omissions or substitutions of equivalents are contemplated as circumstances may suggest or render expedient, but is intended to cover the application or implementation without departing from the spirit or scope of the claims of the present invention. Although specific terms are employed herein, they are used in a generic and descriptive sense only and not for purposes of limitation.

What is claimed is:

1. A collapsible scent training wheel for training animals to detect and respond to target scents, comprising:
   a support base configured to be positioned on a support surface;

a rotatable carousel including a top plate and a plurality of support arms extending radially outward from the top plate, wherein each support arm has a first end rotatably connected to the top plate and a second end configured to be coupled to a scent receptacle; and a hub assembly detachably mechanically coupling the rotatable carousel to the base, wherein the hub assembly is configured to permit the carousel to rotate relative to the base, wherein a connection between the first end of each support arm and the top plate permits each of the support arms to rotate, relative to the top plate, between an open position and a collapsed storage position, wherein the hub assembly comprises a washer plate disposed on a shoulder plate, wherein each of the washer plate and the shoulder plate has a substantially similar annular configuration and includes:

a circular central hub receiving aperture, and an array of through-holes located along a reference circle extending about the receiving aperture, wherein the through-holes of the washer plate and shoulder plate are aligned with one another to each receive a locking device to securely fasten the shoulder and washer plates together, and wherein the hub assembly further includes a hollow tubular hub pipe which extends into the central hub receiving aperture of the shoulder plate and the washer plate and, when the hub assembly is in an assembled configuration, the hub pipe is affixed to a bottom surface of the shoulder plate such that a proximal end of the hub pipe is positioned flush with a top surface of the washer plate.

2. The scent training wheel of claim 1, wherein the first end of each support arm is rotatably connected to a first surface of the top plate by a respective hinge and pin arrangement.

3. The scent training wheel of claim 1, wherein the top plate includes a plurality of support arm brackets angularly spaced about an outer periphery of the top plate and configured to receive a respective first end of one of the plurality of support arms, wherein the first end of each support arm is retained in a respective support arm bracket.

4. The scent training wheel of claim 3, wherein the first end of each support arm is retained in the respective support arm bracket by a pin extending through the support arm bracket and the support arm positioned therein.

5. The scent training wheel of claim 3, wherein each angularly spaced support arm bracket includes:

a first end portion and an opposing second end portion, the second end portion being adjacent to an outer perimeter of the top plate, a channel defined between the first end portion and the second end portion by a first side portion, a spaced apart parallel second side portion, and a back portion structurally interconnecting the first side portion and the second side portion, and wherein the second end portion includes a flange which extends upward from a top surface and cooperates with the first side portion and the second side portion to receive and retain the support arm in a radially outward extended position.

6. The scent training wheel of claim 1, wherein the support base comprises:

a base plate;

an elongated center post extending upwardly from the base plate; and a plurality of support legs extending radially outward and slightly downward from the base plate, wherein each support leg has a first end rotatably connected to the base plate and a second end configured to be positioned on the support surface.

7. The scent training wheel of claim 6, wherein the first end of each support leg is rotatably connected to a first surface of the base plate by a respective hinge and pin arrangement.

8. The scent training wheel of claim 6, wherein the base plate includes a plurality of support leg brackets angularly spaced about an outer periphery of the base plate and configured to receive a respective first end of one of the plurality of support legs, wherein the first end of each support leg is retained in a respective support leg bracket.

9. The scent training wheel of claim 8, wherein the first end of each support leg is retained in the respective support leg bracket by a pin extending through the support leg bracket and the support leg positioned therein.

10. The scent training wheel of claim 8, wherein each angularly spaced support leg bracket includes:

a first end portion and an opposing second end portion, the second end portion extending slightly beyond the outer periphery of the base plate, a channel defined between the first end portion and the second end portion by a first side portion, a spaced apart parallel second side portion, and a back portion structurally interconnecting the first side portion and the second side portion, and wherein the second end portion includes a flange which extends downward from a bottom surface and cooperates with the first side portion and the second side portion to receive and retain the support leg in a radially outward and slightly downward extended position.

11. The scent training wheel of claim 1, wherein the second end of each of the plurality of support arms includes a ring-shaped sleeve member, and wherein each ring-shaped sleeve member has a cylindrical wall defining an open ended cavity configured to removably couple the scent receptacle to the rotatable carousel.

12. The scent training wheel of claim 11, wherein the cylindrical wall of each sleeve member includes a through-aperture configured to receive a threaded fastener for insertion into the cavity for engaging an outer surface of the scent receptacle to provide a positive locking connection such that the receptacle is securely retained within the cavity during rotation of the rotatable carousel.

13. A collapsible scent training wheel for training animals to detect and respond to target scents, comprising:

a support base configured to be positioned on a support surface;

a rotatable carousel comprising a top plate;

a plurality of support arms mechanically coupled to the top plate, wherein a mechanical coupling allows each of the plurality of support arms to pivot between an open position and a closed position; and a hub assembly detachably mechanically coupling the rotatable carousel to the base, wherein the hub assembly is configured to permit the carousel to rotate relative to the base, wherein the hub assembly comprises a washer plate disposed on a shoulder plate, wherein each of the washer plate and the shoulder plate has a substantially similar annular configuration and includes:

a circular central hub receiving aperture, and an array of through-holes located along a reference circle extending about the receiving aperture, wherein the through-holes of the washer plate and shoulder plate are aligned with one another to each receive a locking device to securely fasten the shoulder and washer plates together, and wherein the hub assembly further includes a hollow tubular hub pipe which extends into the central hub receiving aperture of the shoulder plate and the washer plate and, when the hub assembly is in an assembled configuration, the hub pipe is affixed to a bottom surface of the shoulder plate such that a proximal end of the hub pipe is positioned flush with a top surface of the washer plate.

14. The scent training wheel of claim 13, wherein each of the plurality of support arms has a first end that is mechanically coupled to a surface of the top plate by a respective hinge and pin arrangement.

15. The scent training wheel of claim 13, wherein the top plate includes a plurality of support arm brackets angularly spaced about an outer periphery of the top plate and configured to receive a respective one of the plurality of support arms, wherein a first end of each support arm is retained in a respective support arm bracket via a pin extending through the support arm bracket and the support arm positioned therein.

16. The scent training wheel of claim 13, wherein the support base comprises:

a base plate;

an elongated center post extending upwardly from the base plate; and a plurality of support legs mechanically coupled to the base plate, wherein a mechanical coupling allows each of the plurality of support legs to pivot between an open position and a closed position.

17. The scent training wheel of claim 16, wherein each of the plurality of support legs has a first end that is mechanically coupled to a surface of the base plate by a respective hinge and pin arrangement.

18. The scent training wheel of claim 16, wherein the base plate includes a plurality of support leg brackets angularly spaced about an outer periphery of the base plate and configured to receive a respective first end of one of the plurality of support legs, wherein a first end of each support leg is retained in a respective support leg bracket via a pin extending through the support leg bracket and the support leg positioned therein.

19. The scent training wheel of claim 1, wherein the washer plate is fabricated from a thermoplastic polymer resin.

20. The scent training wheel of claim 13, wherein the washer plate is fabricated from a thermoplastic polymer resin.

* * * * *